United States Patent
Ramanujan et al.

(10) Patent No.: US 9,225,637 B2
(45) Date of Patent: Dec. 29, 2015

(54) BORDER GATEWAY BROKER, NETWORK AND METHOD

(75) Inventors: Ranga Sri Ramanujan, Medina, MN (US); Barry Alan Trent, Chanhassen, MN (US); Clint Michael Sanders, Plymouth, MN (US); Maher N. Kaddoura, Maple Grove, MN (US)

(73) Assignee: ARCHITECTURE TECHNOLOGY, INC., Eden Prairie, MN (US)

( * ) Notice: Subject to any disclaimer, the term of this patent is extended or adjusted under 35 U.S.C. 154(b) by 816 days.

(21) Appl. No.: 13/446,341

(22) Filed: Apr. 13, 2012

(65) Prior Publication Data

US 2013/0170499 A1 Jul. 4, 2013

Related U.S. Application Data

(60) Provisional application No. 61/476,053, filed on Apr. 15, 2011.

(51) Int. Cl.
*H04L 12/721* (2013.01)
*H04W 40/26* (2009.01)
*H04L 12/715* (2013.01)
*H04L 12/751* (2013.01)

(52) U.S. Cl.
CPC .............. *H04L 45/70* (2013.01); *H04L 45/026* (2013.01); *H04L 45/04* (2013.01); *H04W 40/26* (2013.01)

(58) Field of Classification Search
None
See application file for complete search history.

(56) References Cited

U.S. PATENT DOCUMENTS

2001/0027484 A1* 10/2001 Nishi ............................ 709/223
2003/0125028 A1* 7/2003 Reynolds ...................... 455/437
2006/0187858 A1* 8/2006 Kenichi et al. ................ 370/254
2010/0061231 A1* 3/2010 Harmatos et al. ............. 370/228
2010/0235514 A1* 9/2010 Beachem ...................... 709/227
2011/0125921 A1* 5/2011 Karenos et al. ............... 709/240

OTHER PUBLICATIONS

Burbank, Jack L. et al. "Key Challenges of Military Tactical Networking and the Elusive Promise of MANET Technology," IEEE Communications Magazine, Nov. 2006, pp. 39-45.
Chau, Chi-Kin et al. "IDRM: Inter-Domain Routing Protocol for Mobile Ad Hoc Networks," Technical Report No. 708, 2008. UCAM-CL-TR-708, ISSN 1476-2986 University of Cambridge, Jan. 2008, pp. 1-24.
Lee, Seung-Hoon, "Inter MR: Inter-MANET Routing in Heterogeneous MANETs," Proceedings of MASS' 2010, Nov. 2010, 10 pages.
Macker, Joseph P. et al. "Heterogeneous Architecture Support for Wireless Network Dynamics and Mobility," Naval Research Laboratory NRL/MR/5520-00-8513. Dec. 29, 2000, 32 pages.
Pei, Dan et al. "BGP-RCN: Improving BGP Convergence Through Root Cause Notification," Computer Networks. Sep. 28, 2004, 20 pages.

(Continued)

*Primary Examiner* — Hassan Phillips
*Assistant Examiner* — Saba Tsegaye
(74) *Attorney, Agent, or Firm* — IPLM Group, P.A.

(57) ABSTRACT

A device-implemented network with domains each having nodes, the nodes of each of the domains sharing network information with one another according to an intra-domain communication policy. An inter-domain protocol is configured to control communication between at least one of the nodes of one of the domains and at least one of the nodes of a different one of the domains. A broker is configured to be communicatively coupled to the nodes and configured to control communication according to the inter-domain protocol and to which all of the nodes of each of the plurality of domains are configured to send the network information.

60 Claims, 13 Drawing Sheets

(56) References Cited

OTHER PUBLICATIONS

Pizzi, Steven V. "A Routing Architecture for the Airborne Network" MILCOM Paper Tracking Number: 248, Version 5.40. 2007 The MITRE Corporation. May 21, 2007, pp. 1-7.

Rekhter, Y. et al. "Application of the Border Gateway Protocol in the Internet" IETF RFC 1772. Mar. 1995, 19 pages.

Rekhter, Y. et al. "A Border Gateway Protocol 4 (BGP-4)" IETF RFC 1771, Mar. 1995, [online] [retrieved on Jul. 16, 2014], retrieved from the internet <http://www.ietf.org/rfc/rfc1771.txt> 50 pages.

* cited by examiner

BORDER GATEWAY BROKER, NETWORK AND METHOD

RELATED APPLICATIONS

This application claims priority from U.S. Provisional Application No. 61/476,053, filed on Apr. 15, 2011, entitled "BORDER GATEWAY BROKER, NETWORK AND METHOD".

STATEMENT REGARDING FEDERALLY SPONSORED RESEARCH OR DEVELOPMENT

This invention was made with government support under contract BGPMX-FA 8750-09-C-0120 awarded by the U.S. Air Force/Air Force Material Command (AFMC)/Air Force Research Laboratory (AFRL). The government has certain rights in the invention.

FIELD

This application relates generally to computer networks and, more particularly, to communication in computer networks, communication brokers for computer networks and methods therefore.

BACKGROUND

Communication networks are well known in the art. Multiple nodes may be incorporated into a common communication system for the purposes of exchanging data of various kinds. Such networks may exist for myriad purposes and incorporate anywhere from two nodes to thousands or millions of nodes. While many such networks are relatively static in location and composition, networks may be increasingly physically mobile and may be rapidly variable in composition. Thus, while many conventionally wired networks do not pose substantial challenges in maintaining the integrity of the network, even when nodes move about and enter and leave the network, managing mobile networks may create relatively greater challenges in supporting the network.

Even among mobile networks, however, the challenges of network maintenance may be comparatively straight forward. Commonly available local wireless transmitters which facilitate direct communications between two nodes in a network exist which transmit to ranges of kilometers or tens of kilometers. Over land-based networks, such ranges may mean that, in many cases, nodes moving even at relatively high land speeds may only infrequently enter and leave the operational range of other nodes. In such cases, the network support structures may be able to manage the evolving nature of the network, as in such cases the network does not evolve extremely quickly.

By contrast, local airborne networks may evolve very quickly. A transmitter on an aircraft moving from many hundreds of kilometers per hour up to thousands of kilometers per hour may enter and then leave the effective range of the transmitter of another node in a matter of seconds. Largely unconstrained by geography, airborne nodes may be subject to rapid changes in direction and may take courses in opposition to one another, additively combining the nodes' relative speeds to even further lessen the time the nodes may be in local communication with one another.

In certain applications such as military networks, steps which may be taken to mitigate such factors may be undesirable or impractical to implement. While transmitters for direct communication between nodes with ranges of hundreds or even thousands of kilometers may be utilized, such transmitters may also be detectable at ranges far greater than their effective range. This characteristic may make the network detectable by an opposing force at extremely long ranges, giving the opposing force information as to the nature of the network and allowing for the possibility of interference or compromise of the network. Similarly, satellite communications may be subject to compromise, disruption or outright disablement owing to the extreme ranges involved and the potential vulnerability of the satellite to attack.

Currently, the standard networking protocols, such as Border Gateway Protocol (BGP), enable autonomous network domains to be interconnected into a global Internet Protocol-based internetwork. The Internet is commonly known as the networked communication system interconnecting various sub-networks throughout the world. Various users of the term "Internet" may utilize the term interchangeably or in substitution for other terms such as "internet" and "World Wide Web". It is to be recognized and understood, however, that the Internet may refer to other internetworking systems and protocols for linking nodes, either public or private, existing or yet to be developed. The Internet Protocol is a standard protocol for over the Internet. However, such standard networking protocols commonly incorporate static peering mechanisms which are designed for interconnecting stationary network domains, as well as route repair mechanisms which are commonly designed for the Internet, i.e., an environment which experiences relatively infrequent topology changes. In a mobile environment, and particularly an airborne environment, this peering mechanism may tend to break down, resulting in protocols such as BGP being challenged to maintain connectivity between and among the nodes of the network.

SUMMARY

A network with a networking protocol has been developed which may improve network connectivity and may reduce communications outages in networks with mobile nodes relative to conventional networking protocols. In various embodiments, the network protocol incorporates functionality such as a dynamic discovery mechanism to automatically and with relatively quick response time discover and incorporate new nodes into the network. The network protocol may further incorporate proactive link monitoring between nodes to regularly and rapidly assess the state of the network links. In additional embodiments, the protocol may further incorporate a mobility index of nodes within the network to provide the network an ability to anticipate movement of nodes within and outside of the network and plan interaction within the network accordingly.

As a consequence of these features, a network having mobile nodes may be actively managed so as to provide networking capabilities on local, direct communication links. By providing for dynamic discovery, nodes may enter the network rapidly. By monitoring links, broken links may result in a rerouting of the network and the deletion of absent nodes. By providing a mobility index, links within the network may be established in a manner that is mindful of a likelihood of a link to be present in the future.

In so doing, military applications in particular may be strengthened relative to existing networks. In various mobile military networks, the advantages of networking may be maintained while keeping links direct and relatively secure. In a highly mobile environment, nodes may enter and leave the network with relative seamlessness and minimal disruption, either to the node's operation or the operation of the network in general. Such benefits may be felt particularly in aerial networks, where fast-moving military aircraft maneuvering aggressively may place unique stress on network management.

In an embodiment, a device-implemented network comprises a plurality of domains, an inter-domain protocol and a broker. The plurality of domains each have a plurality of nodes, wherein the plurality of nodes of each of the plurality of domains share network information with one another according to an intra-domain communication policy. The inter-domain protocol is configured to control communication between at least one of the plurality of nodes of one of the plurality of domains and at least one of the plurality of nodes of a different one of the plurality of domains. The broker is configured to be communicatively coupled to the plurality of nodes and configured to control communication according to the inter-domain protocol and to which all of the plurality of nodes of each of the plurality of domains are configured to send the network information.

In an embodiment, the inter-domain protocol comprises, at least in part, a beacon signal configured to be sent to at least one node of at least one of the plurality of domains.

In an embodiment, the plurality of nodes are configured to respond to the beacon signal such that at least one of the plurality of nodes responds to the beacon signal.

In an embodiment, any of the plurality of nodes which receive the beacon signal are configured to respond to the beacon signal.

In an embodiment, all of the plurality of nodes which receive the beacon signal are configured to respond to the beacon signal.

In an embodiment, the intra-domain communication policy is based, at least in part, on signal strength.

In an embodiment, the intra-domain communication policy is based, at least in part, on signal quality.

In an embodiment, the intra-domain communication policy is based, at least in part, on an identity of a destination domain of the plurality of domains.

In an embodiment, the intra-domain communication policy is based, at least in part, on a geographic location of the plurality of nodes.

In an embodiment, the intra-domain communication policy is based, at least in part, on a communication path between individual ones of the plurality of nodes.

In an embodiment, the communication path has at least an intervening one of the plurality of nodes.

In an embodiment, the path is based, at least in part, on a closest one of the plurality of nodes.

In an embodiment, the path is based, at least in part, on a signal strength.

In an embodiment, the path is based, at least in part, on a highest signal speed.

In an embodiment, the path is based, at least in part, on a highest signal capacity.

In an embodiment, the path is based, at least in part, on a geographic stability of the intervening one of the plurality of nodes.

In an embodiment, the broker is one of the plurality of nodes of one of the plurality of domains.

In an embodiment, all of the plurality of nodes sends the network information to the broker periodically.

In an embodiment, the network information is indicative of a condition of the network.

In an embodiment, the information indicative of the condition of the network comprises location information of at least some of the plurality of nodes.

In an embodiment, the information indicative of the condition of the network is indicative of a mobility index comprising an anticipated relative speed of at least some of the plurality of nodes.

In an embodiment, the broker is configured to route inter-domain communication between individual ones of the plurality of nodes according to the mobility index.

In an embodiment, the mobility index is updated based, at least in part, on communication between the broker and the at least some of the plurality of nodes.

In an embodiment, the mobility index is periodically updated.

In an embodiment, when one of the plurality of nodes is not communicatively coupled to the broker, the one of the plurality of nodes utilizes the inter-domain protocol.

In an embodiment, a network communication broker is configured to control communication in a network having a plurality of domains each having a plurality of nodes. The network communication broker has a communication module operatively coupled to each of the plurality of nodes of each of the plurality of domains, configured to obtain network information from each of the plurality of nodes of each of the plurality of domains according to an intra-domain communication policy and an inter-domain protocol configured to control communication between at least one of the plurality of nodes of one of the plurality of domains and at least one of the plurality of nodes of a different one of the plurality of domains.

In an embodiment, a method is provided for communicating according to an inter-domain protocol between a plurality of nodes of a plurality of domains, each of the plurality of domains having some of the plurality of nodes, the communicating being controlled by a broker. The method comprises the steps of sharing network information between the plurality of nodes of each of the plurality of domains according to an intra-domain communication policy, controlling, by the broker, communication according to the inter-domain protocol between at least one of the plurality of nodes of one of the plurality of domains and at least one of the plurality of nodes of a different one of the plurality of domains and sending to the broker network information from all of the plurality of nodes of each of the plurality of domains.

In an embodiment, the method further comprises the step of sending a beacon signal to at least one node of at least one of the plurality of domains according to the inter-domain protocol.

In an embodiment, the method further comprises the step of responding to the beacon signal such that at least one of the plurality of nodes responds to the beacon signal.

In an embodiment, the responding step comprises any of the plurality of nodes which receive the beacon signal responding to the beacon signal.

In an embodiment, the responding step comprises all of the plurality of nodes which receive the beacon signal responding to the beacon signal.

In an embodiment, the sharing step according to the intra-domain communication policy is based, at least in part, on signal strength.

In an embodiment, the sharing step according to the intra-domain communication policy is based, at least in part, on signal quality.

In an embodiment, the sharing step according to the intra-domain communication policy is based, at least in part, on an identity of a destination domain of the plurality of domains.

In an embodiment, the intra-domain communication policy is based, at least in part, on a geographic location of the plurality of nodes.

In an embodiment, the sharing step according to the intra-domain communication policy is based, at least in part, on a communication path between individual ones of the plurality of nodes.

In an embodiment, the communication path has at least an intervening one of the plurality of nodes.

In an embodiment, the path is based, at least in part, on a closest one of the plurality of nodes.

In an embodiment, the path is based, at least in part, on a signal strength.

In an embodiment, the path is based, at least in part, on a highest signal speed.

In an embodiment, the path is based, at least in part, on a highest signal capacity.

In an embodiment, the path is based, at least in part, on a geographic stability of the intervening one of the plurality of nodes.

In an embodiment, the sending step occurs periodically.

In an embodiment, the network information is indicative of a condition of the network.

In an embodiment, the information indicative of the condition of the network comprises location information of at least some of the plurality of nodes.

In an embodiment, the information indicative of the condition of the network is indicative of a mobility index comprising an anticipated relative speed of at least some of the plurality of nodes.

In an embodiment, the method further comprises routing inter-domain communication between individual ones of the plurality of nodes by the broker according to the mobility index.

In an embodiment, the method further comprises updating the mobility index based, at least in part, on communication between the broker and the at least some of the plurality of nodes.

In an embodiment, the updating step is conducted periodically.

In an embodiment, when one of the plurality of nodes is not communicatively coupled to the broker, the sharing step utilizes the inter-domain protocol.

FIGURES

DESCRIPTION

The entire content of U.S. Provisional Application Ser. No. 61/476,053, filed Apr. 15, 2011 is hereby incorporated by reference.

Figure 1:
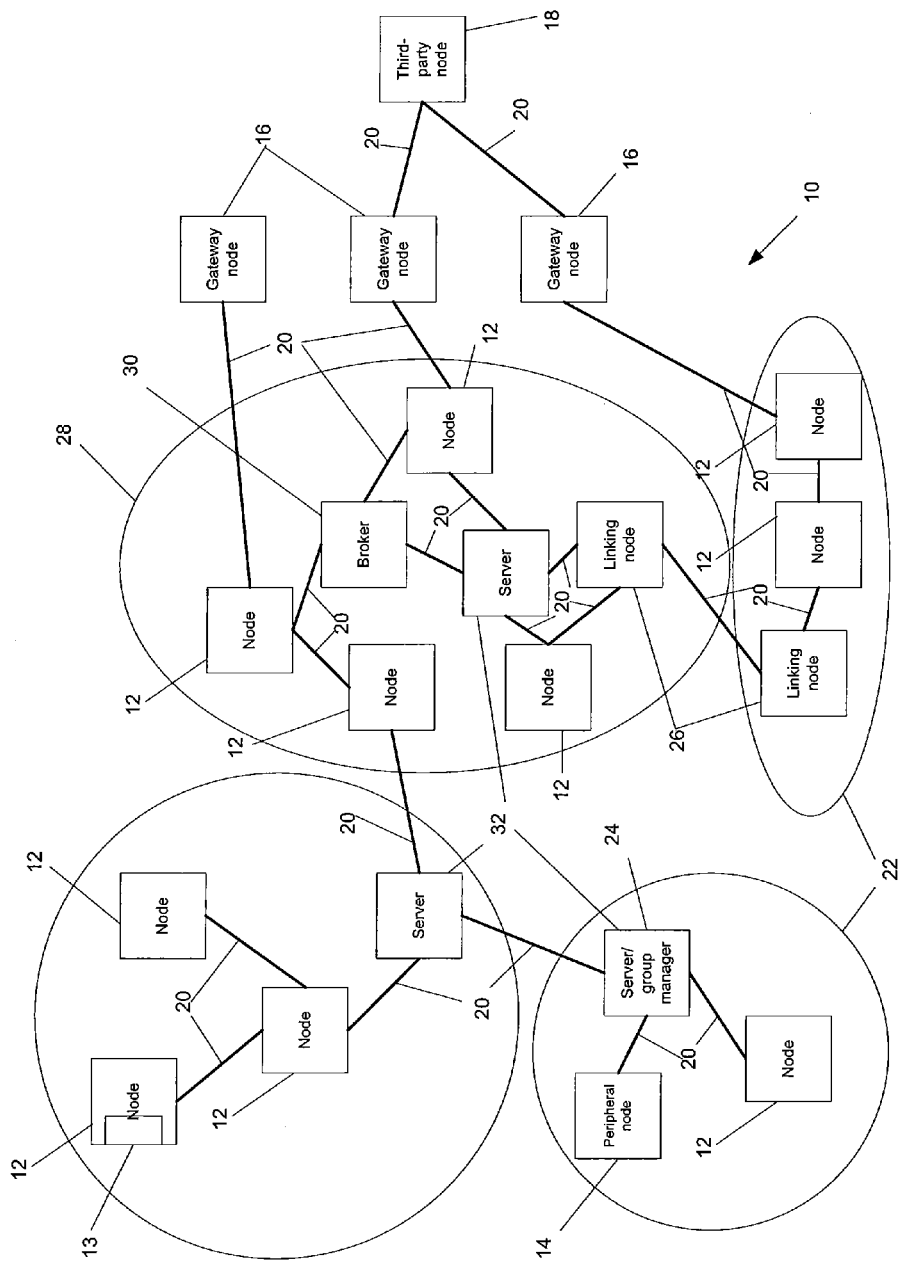
FIG. 1 is a block diagram of a communication network.

FIG. 1 is an exemplary communication network. Network 10 incorporates multiple nodes 12 which incorporate a communication module 13, illustrated in one exemplary embodiment of node 12, configured to communicate variably over wireless and wired media. An example of nodes 12 includes peripheral nodes 14, which may be conventional components of network 10 which utilize network resources but which do not contribute to the management of network 10, such as conventional computers and other electronic devices, whether proprietary or off-the-shelf, commercially available products In alternative embodiments, peripheral nodes 14 may be a router, repeater or other component which may serve as a gateway to multiple nodes 12 in a dedicated or otherwise private sub-network.

Nodes 12 may further include gateway nodes 16, which may themselves be communicatively coupled to third-party nodes 18. In various embodiments, gateway nodes 16 are similar to conventional peripheral nodes 14 but which further incorporate a router, repeater or other component which may serve as a pathway to link peripheral nodes 14 and gateway nodes 16 to third-party nodes 18. Such communication with third-party nodes 18 may be by way of conventional Internet protocols, such as the Border Gateway Protocol, as described above.

Third-party nodes 18 may not be integral components of network 10. Third-party nodes 18 may incorporate nodes present in other networks, including but not limited to the Internet, and may not be capable of interfacing directly with peripheral nodes 14. As illustrated, peripheral nodes 14 of network 10 are thus not coupled directly to the Internet or other outside nodes 18. Instead, gateway nodes 16 are configured to communicate both with nodes 12 of network 10 and third-party nodes 18, with connectivity of peripheral nodes 14 to gateway nodes 16 providing access to information not already incorporated into network 10.

Communication links 20 link various of nodes 12 to other nodes 12. In various embodiments, communication links 20 are wired and wireless links. The wireless links may include various standards, including conventional, commercially available standards such as cellular, Bluetooth and WiFi, as well as proprietary systems. In various embodiments, the operative range of wireless links 20 may vary from meters to kilometers. In various embodiments, nodes 12 are configured to establish a link 20 with any other node 12 of network 10 within communication range. In alternative embodiments, nodes 12 are configured to establish communication only with predetermined nodes 12 of network 10 or nodes 12 of network 10 which otherwise meet various conditions on establishing communications. In certain embodiments, such conditions may incorporate hierarchical organizations or other organization structures, as discussed in detail below.

Nodes 12 may be organized into autonomous domains or groups 22. In such groups 22, each node 12 of the group 22 may be configured to communicate directly with every other node 12. Alternatively, every node 12 within a group 22 may be configured to communicate with another node 12 with a relatively limited number of forwards or "hops" from node 12 to node 12 within group 20, in an embodiment one hop.

Groups 22 may incorporate a group manager node 24 to manage intra-domain communications within and the member nodes 12 of the group 22.

Communications between groups 22 may proceed according to links 20 between an individual peripheral node 14 configured as a linking node 26 of each group 22. In various embodiments, a single linking node 26 in each group 22 is assigned to provide link 20 between the groups 22. If a node 12 within one group 22 desires to communicate with a node 12 in another group 22, the communications occur by way of linking nodes 26 within each group 22.

In various embodiments, master group 28 provides a network backbone for network 10. In such embodiments, all nodes 12 which are part of network 10 and which are within range of master group 28 are incorporated within master group 28. On this basis, groups 22 may exist to provide administrative control of nodes 12 only to the extent that nodes 12 are not part of master group 28. Alternatively, even in embodiments with master group 28, groups 22 may be formed for particular purposes and their integrity maintained.

Network 10 may be organized according to a geographic overlay system. Network communication broker 30 may be resident servers of network 10 and may be co-located or geographically distributed. Network communication broker 30 may implement mechanisms that serve to "route" messages from the transmitting nodes 12 to receiving nodes 12 of messages, including geographically targeted messages. Network communication broker 30 may be configured to manage only such links 20 as are between groups 22, i.e., inter-group or inter-domain links, while intra-group communication may occur according to group master node 24. Consequently, network communication broker 30 may manage the inter-domain protocol for communications between nodes 12 in different groups 22.

Network communication broker 30 may be configured with a geographic data service based on the geographic overlay system to track and control mobile nodes 12, including gateway nodes 16, within mobile groups 22 and master group 28. A distributed peering broker service maintained by broker or network communication broker 30 of network 10 uses the geographic overlay to select nodes 12 for dynamic peering with other nodes 12. In such embodiments, the distributed peer broker service responds to queries of nodes 12 for peering instructions and commands nodes 12 to re-peer as necessary based on movement of nodes 12 within the geographic overlay network.

The geographic overlay network may be based on various factors. In certain embodiments, nodes 12 incorporate global positioning system functionality to provide a specific location of node 12. Alternatively, nodes 12 may obtain their positioning based on systems such as accelerometers, gyroscopes and other devices known in the art for tracking positioning. Further alternatively, positioning of nodes 12 within the geographic overlay network may be maintained relative to other nodes 12 in network 10. For instance, a node 12 may be evaluated as being at a certain distance and bearing from a number of other nodes 12 in network 10. In such an embodiment, the location of node 12 in two- or three-dimensional space within the geographic overlay system may be determined.

Network communication broker 30 which incorporate the geographic data service may be a relatively stable node 12. Stability may be attained, in an embodiment, by network communication broker 30 being immobile or relatively less mobile in comparison with other nodes 12. Alternatively, network communication broker 30 may simply be a conventionally mobile node 12 and designated as a point about which other nodes 12 operate however network communication broker 30 may reposition itself in comparison with other nodes 12. In so doing, network communication broker 30 may construct a load-sharing hierarchy of nodes 12 to meet geographic and traffic demands.

The geographic data service may be implemented as a network service that runs over conventional networking protocols, such as the Internet Protocol. In an embodiment, any wireless or wired device which is configured to communicate according to the protocol may utilize the geographic data service to send or receive geographically targeted and specific information. Nodes 12 are configured to periodically report network information such as their location information and network address to server 32. In an embodiment, server 32 is a GEOnet Name Server ("GNS") known in the art and configured to cover a geographic region where various nodes 12 are currently located.

Utilizing network communication broker 30 provides a sending node 12 the ability to send geographically addressed messages to destination nodes 12. In such a circumstance, sending node 12 first sends a query to server 32 specifying a target polygon defining the destination of the message. Server 32 responds with the network addresses of nodes 12 within the destination polygonal area. In an embodiment, sending node 12 could send a set of unicast messages to all destination nodes 12 corresponding to the network addresses returned by server 12. Alternatively, sending node 12 requests all nodes 12 in the region of interest to join a temporary multicast group 22 for the geographic area specified in the message. Creating group 22 may avoid sending the same message across the same link several times. Messages to group 22 may be sent on that multicast address. Whether or not to establish group 22 may be based, at least in part, on the number of receiving nodes 12 and an amount of data to be transmitted.

Figure 2:
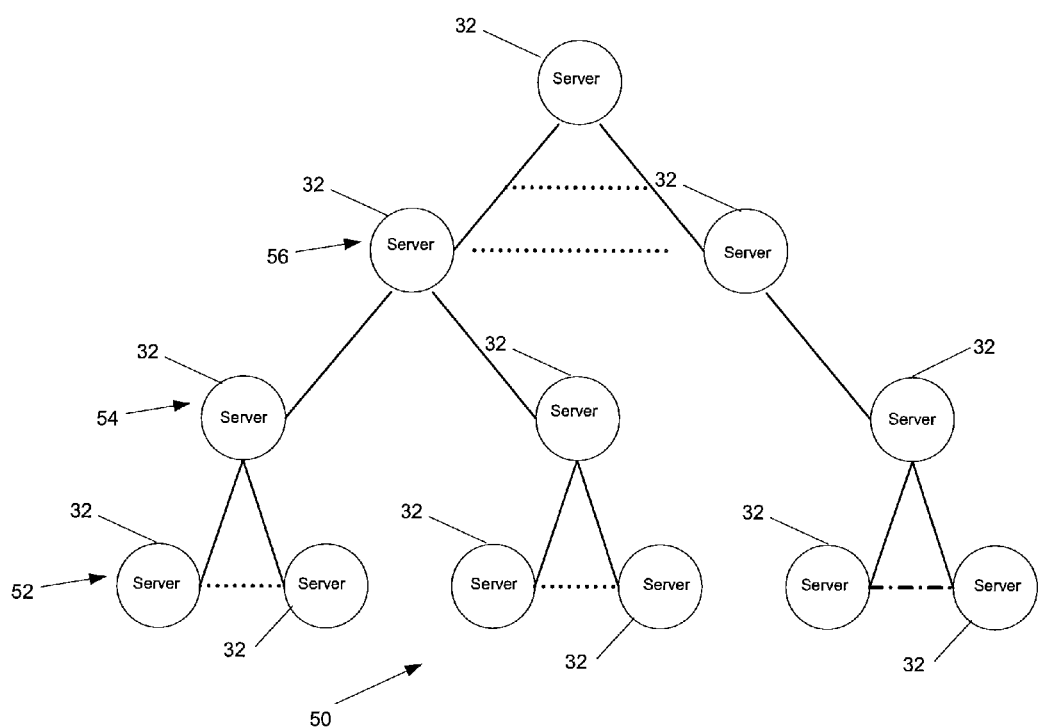
FIG. 2 is a block diagram of an organization of servers of the network of FIG. 1.

FIG. 2 is an illustration of an exemplary organization of servers 32. As illustrated, servers 32 are organized as logical tree 50. Each server 32 at the lowest level 52 of tree 50 (i.e., first level servers 32), covers a defined local geographic region. Each server 32 maintains mapping between the network addresses and location data of the registered nodes 12 (FIG. 1) located in the corresponding region. In an embodiment, each server 32 also maintains a network address of its parent server 32 in tree 50.

Each server 32 at second level 54 is associated with a geographic region that covers a union of the regions associated with each of the first level 52 servers 32 that are the second level server's 32 children. A server 32 at second level 54 maintains the network addresses of level one 52 servers 32 whose regions fall within the boundaries of the larger region covered by the level two 54 server 32. Each level two 54 server 32 also maintains a network address its level three 56 parent 32 in tree 50. The relationship of level three 56 servers 32 to level two 54 servers continues relatedly. In an embodiment, only level one 52 servers 32 maintain geographic location and network addresses of nodes 12 (FIG. 1). In such an embodiment, higher level 54, 56 servers 32 only maintain the IP addresses of servers 32 that are either their parent or children in tree 50.

Figure 3A:
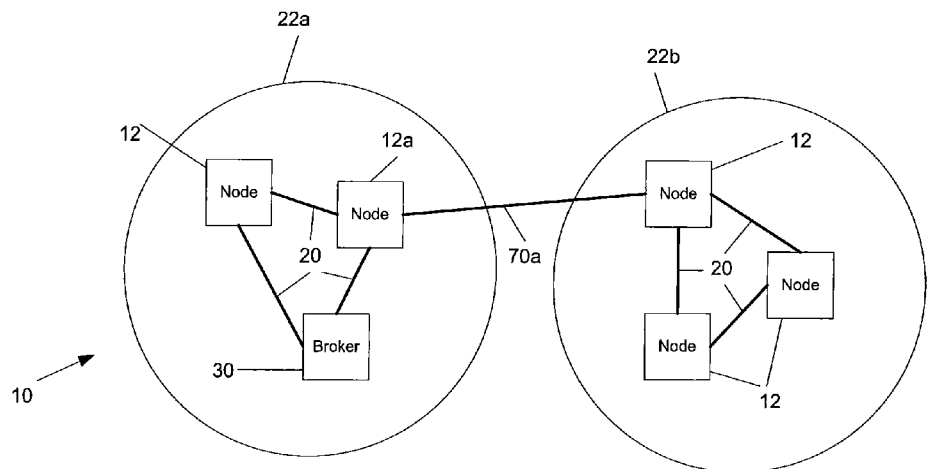
FIGS. 3a and 3b are block diagrams of links between nodes of a network.
Figure 3B:
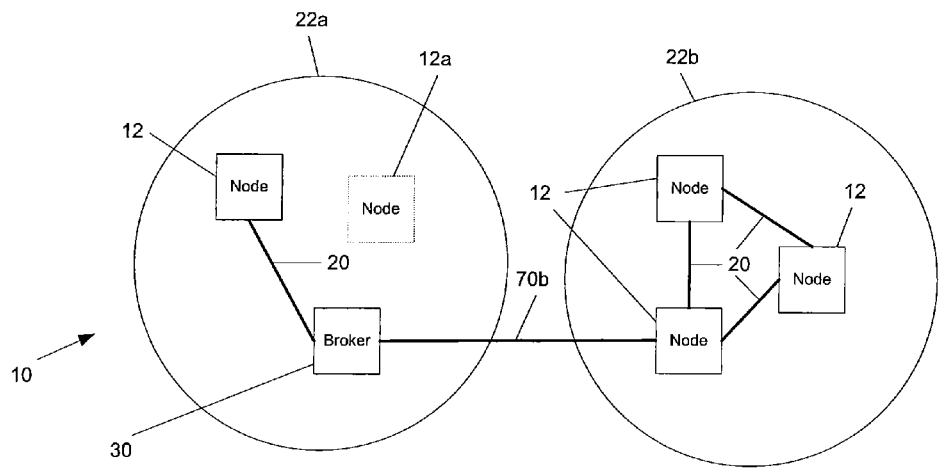

FIGS. 3a and 3b are simplified depictions of links 20 between groups 22 (FIG. 1) and illustrate a progression from a first time shown in FIG. 3a to a second time shown in FIG. 3b in which one node 12a is removed from or becomes unstable within group 22a. As a result, inter-group link 70a is deleted and a new inter-group link 70b is created between groups 22a and 22b. In various embodiments, inter-group links 70a, 70b are the same as links 20 other than that inter-group links 70a, 70b connected between groups 22a, 22b.

In various embodiments, nodes 12 periodically report their geographic location and, in certain embodiments, additional information such as signal strength of links 20 with neighboring nodes 12, signal quality of links 20 with neighboring nodes, existing communication routes or paths (100a, 100b; FIG. 6) and mobility indexes to network communication broker 30. Network communication broker 30 is configured to determine which nodes 12 should establish inter-group links 70a, 70b. Network communication broker 30 may be configured to utilize the geographic locations of nodes 12 and, in various embodiments, mobility indexes, to periodically adjust inter-group links 70a, 70b to improve inter-group communication among nodes 12. In an embodiment, network communication broker 30 chooses nodes 12 that provide the most stable links to minimize disconnection in network 10. In such an embodiment, when link 70a becomes unstable owing to the removal or instability of node 12a, network communication broker 30 is configured to instruct nodes 12 in groups 22a, 22b to disconnect link 70a (FIG. 3a) and to establish relatively more stable link 70b (FIG. 3b).

In an embodiment, network communication broker 30 periodically disseminates part of its geographic overlay system to nodes 12. In such an embodiment, the distribution of the geographic overlay system may provide information which allows reconstruction of network 10 in the event network communication broker 30 becomes unavailable or to allow the establishment of a new group 22 or network 10 in the event various nodes 12 become separated from network 10. The frequency of the transmission of the geographic overlay system and the amount of information in the distributed geographic overlay system that is stored in nodes 12 may, in various embodiments, depend on the geographic locations and qualities of service of nodes 12. When a node 12a gets disconnected from its group 22 or network 10, another node 12 can use the cached information to reestablish connection with network communication broker 30 and network 10. When using a packet forwarding mechanism, node 12 can utilize the stored information to determine possible future peering gateways.

Figure 4A:
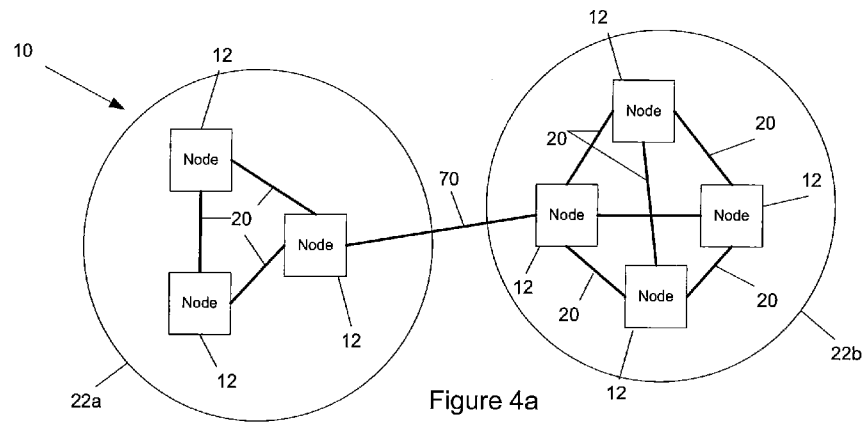
FIGS. 4a and 4b are block diagrams of dynamic discovery in a network.
Figure 4B:
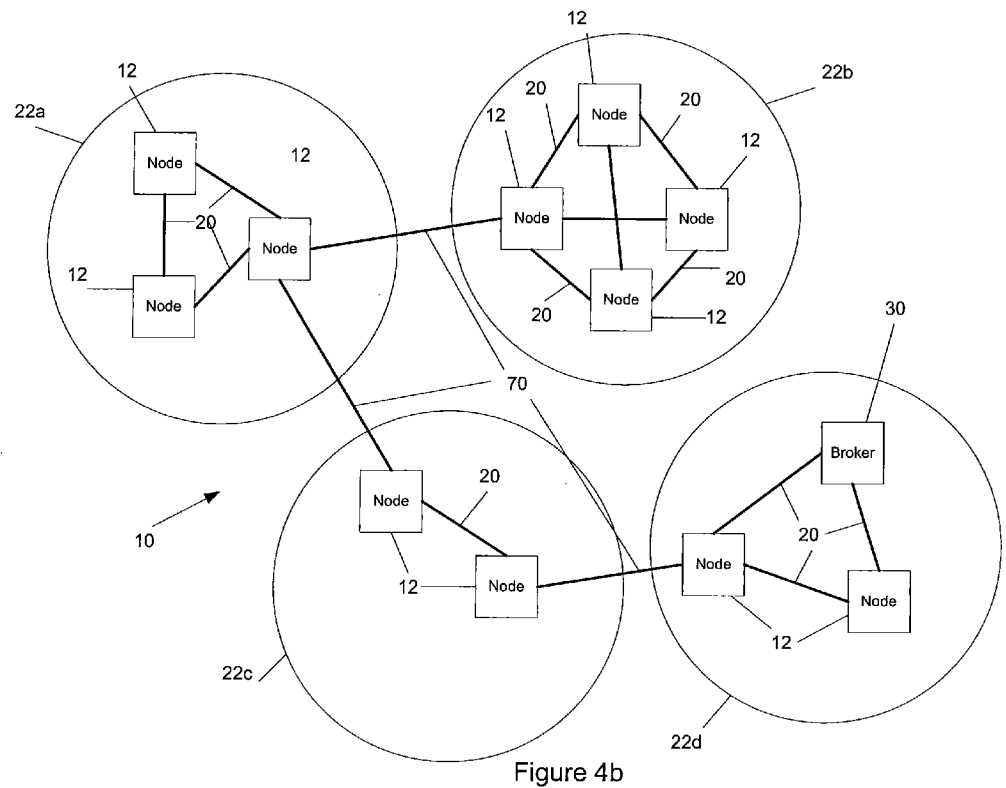

FIGS. 4a and 4b are diagrams illustrating external dynamic discovery of nodes 12, where FIG. 4a shows network 10 having groups 22a, 22b at a first time and FIG. 4b shows network incorporating new groups 22c and 22d at a second time later than the first time. According to an embodiment of the inter-domain protocol of network communication broker 30 and nodes 12 generally, if a node 12 of group 22a cannot find a path to network communication broker 30, node 12 broadcasts a signal such as an external beacon in order to discover nodes 12 in adjacent group 22b. When two nodes 12 in adjacent groups 22a, 22b receive an external beacon from one another, or one node 12 responds to a beacon signal from another node 12 by transmitting its own beacon signal, such nodes 12 may establish link 20 with each other. Nodes 12 may maintain the link 20 as long as they can maintain link 20 or can continue to hear each other's beacon signal. If node 12 cannot hear the beacon signal for certain amount of time, or if link 20 degrades to a predetermined level, node 12 may terminate link 20.

If node 12 creates an inter-domain link 70, node 12 may try to connect to network communication broker 30. Once nodes 12 in a group 22a finds a path to network communication broker 30, nodes 12 may stop using the external discovery mechanism and rely on network communication broker 30 to establish or maintain inter-domain links 70 with adjacent groups 22b. It is noted that, in certain embodiments, network communication broker 30 is configured to maintain only inter-domain links 70, while groups 22a, 22b maintain their own intra-domain links 20.

In the illustrative embodiment of FIG. 4a, groups 22a, 22b, neither of which incorporate network communication broker 30, establish communication between each other using the external discovery mechanism. Because neither domain has a path to a network communication broker 30 (FIG. 4a), the nodes 12 may continue to use the external discovery mechanism to search for adjacent group 22c as in FIG. 4b. In FIG. 4b, once groups 22c, 22d are present and capable of being integrated within network 10, groups 22c, 22d may establish communication between each other in the first instance using the external discovery mechanism. However, because group 22d includes network communication broker 30, once inter-domain links 70 have been established between groups 22a, 22b, 22c, 22d, nodes 12 in all of illustrated groups 22a, 22b, 22c, 22d may stop using the external discovery mechanism and instead utilize network communication broker 30 to make new links 20 between their respective groups 22a, 22b, 22c, 22d.

In an embodiment illustrated in each of FIGS. 4a and 4b, nodes 12 include location information in the external beacon. Consequently, when nodes 12 of group 22a transmit an external discovery mechanism beacon signal and a node of adjacent group 22b detects the beacon signal, nodes 12 in adjacent group 22b may coordinate among themselves so that the geographically nearest node 12 to the sending node 12 of group 22a responds to the external discovery mechanism beacon signal. Similarly, as disclosed herein, the nodes 12 of group 22a may then establish which node 12 is nearest adjacent group 22a or which may otherwise provide the best communication with group 22b, and utilize that node 12 for communication with group 22b.

In a further embodiment, again illustrated in each of FIGS. 4a and 4b, nodes 12 in the adjacent group 22b might receive external discovery beacons from several nodes 12 from the same group 12a. All nodes 12 of adjacent group which receive the beacon signal may respond to the beacon signal with their own beacon signal. Alternatively, the nodes 12 in the adjacent group 22b may coordinate among themselves so that nodes 12 of adjacent group 22b only respond to a subset of nodes 12 of group 22a that send the external beacons. Each group 22 (FIG. 1), such as group 22a, may be configured with an upper limit on the number of inter-group links 70 that it can establish with an adjacent group 22b. In an embodiment, only one inter-group link 70 is established between groups 22a, 22b. For example, the nodes 12 in group 22a respond to external beacons that have the most stable links 20. In an exemplary embodiment, if nodes 12 in group 22a receive five external discovery beacons and their upper limit on adjacent links 20 are three, then nodes 12 will choose the best three links 20 out of the five possible links.

Figure 5A:
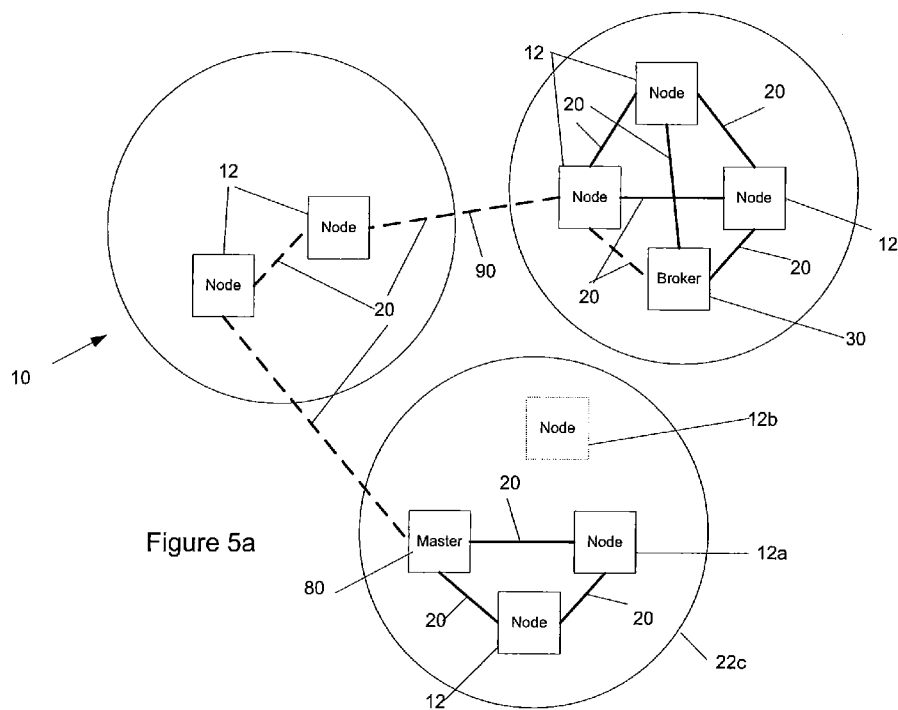
FIGS. 5a and 5b are block diagrams of internal dynamic discovery in a network.
Figure 5B:
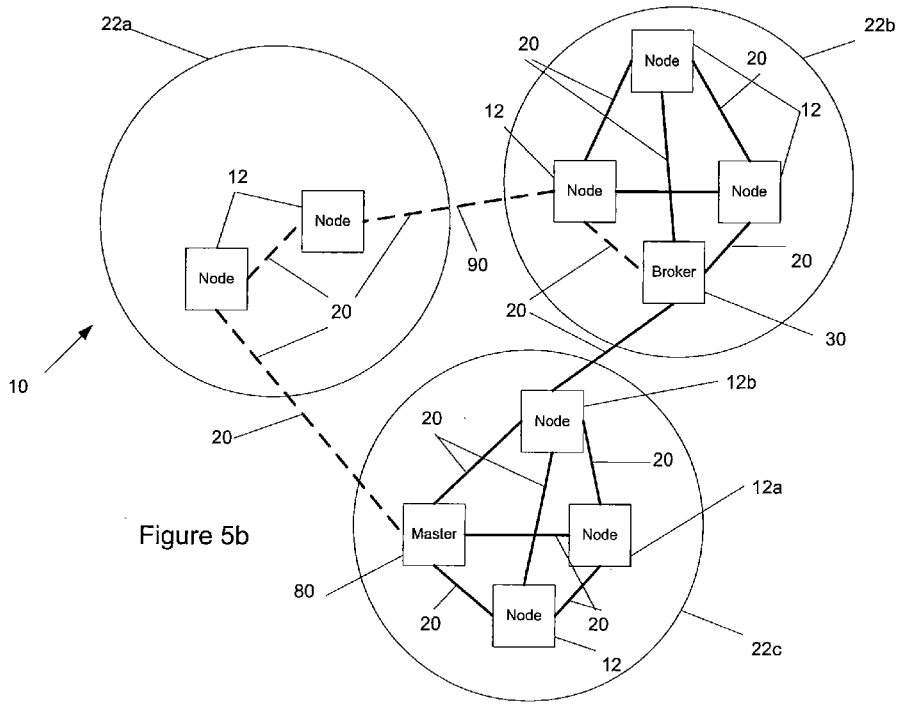

FIGS. 5a and 5b are exemplary, simplified illustrations of an internal dynamic discovery mechanism of nodes 12. FIG. 5a shows network 10 at a first time and without node 12b having been incorporated into network 10 while FIG. 5b shows network 10 at a second time later than the first time where one node 12b has been incorporated into network 10. As illustrated, previously independently identified elements such as peripheral nodes 14, gateway nodes 16 and third-party nodes 18 are subsumed in nodes 12 generally, though are understood to be incorporated where appropriate. In an embodiment, each node 12 is preconfigured with an identification of its group 22a, 22b, 22c. In various embodiments, node 12 periodically broadcasts an internal beacon to announce itself and to discover other links 20 in node's 12 group 22a, 22b, 22c. In certain embodiments, the internal beacon also incorporates information relating to nodes external to the group 22a, 22b, 22c of which the transmitting node is aware, for instance nodes 12 in groups 22a, 22b, 22c, to facilitate the creation of efficient links 20 to the nodes 12 of groups 22a, 22b, 22c.

When a node 12a detects the presence of a new node 12b in group 22c (FIG. 5a), node 12a adds node 12b to the list of available internal nodes 12 for group 22c and establishes link 20 with node 12b (FIG. 5b). Alternatively or simultaneously, new node 12b may be configured to detect the presence of node 12a and other nodes 12 of group 22c. Nodes 12 that have established links 20 may elect one of nodes 12 to broadcast internal beacons on behalf of group 22c. In such an embodiment, such a node 12 may be designated master node 80. In an embodiment, the internal beacon may include the network addresses of all of nodes 12 corresponding to master node 80. Alternatively, the internal beacon may incorporate a reduced subset of nodes 12 corresponding to master node 80. If master node 80 moves out of group 22c, nodes 12 may stop hearing the beacon and, as a consequence, they may elect a new master node 80.

When a node 12a loses connection with internal node 12b, node 12a may not immediately withdraw links 20 that it has learned from disconnected node 12b. Rather, node 12a may wait for a predetermined time to allow disconnected node 12b to reestablish link 20. In an embodiment, disconnected node 12b commences broadcasting internal beacons upon disconnection of link 20. The internal beacons may inform nodes 12 that disconnected node 12b is still in the group and it is trying to reestablish connection.

As shown in FIG. 5a, node 12b joins group 22a. New node 12b listens for internal beacons from other nodes 12 in group 22c. When node 12b receives a beacon, it may learn the addresses of three nodes 12 that are in group 22c. As shown in FIG. 5b, new node 12b may establish communication with nodes 12, whereupon new node 12b may learn from the other nodes of links 20 which form route 90 (denoted by links 20 illustrated by a dashed line) to network communication broker 30 and start sending location information of node 12b to network communication broker 30. Upon receiving the location of node 12b, network communication broker 30 may instruct new node 12b to conduct peer-to-peer communications with a node 12 that resides in group 22b, in the illustrated embodiment network communication broker 30 itself.

Figure 6A:
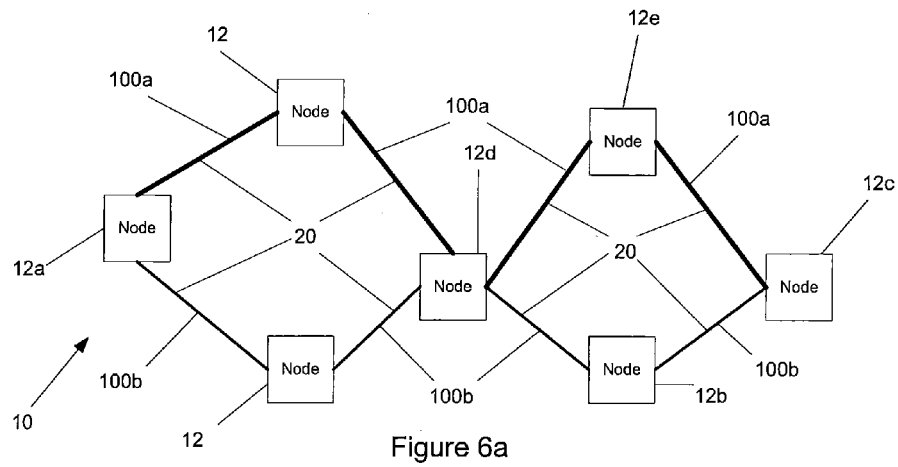
FIGS. 6a and 6b are a block diagram of proactive link monitoring in a network.
Figure 6B:
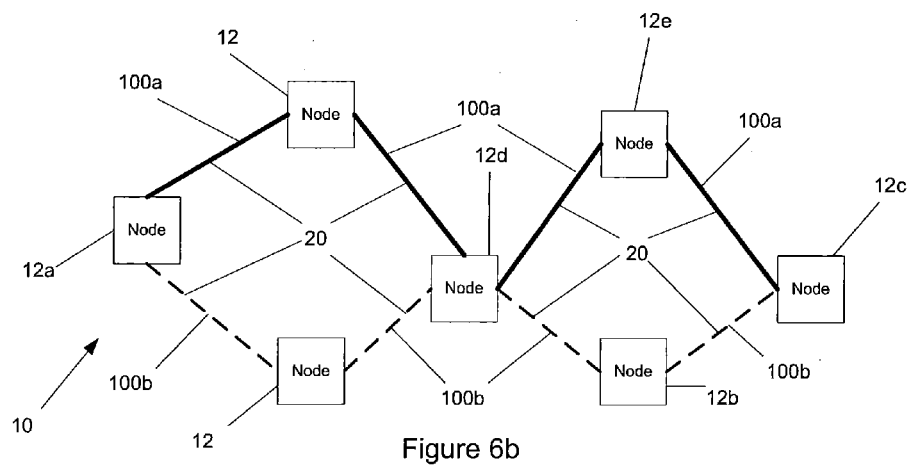

FIGS. 6a and 6b show a simplified embodiment of proactive link monitoring, with FIG. 6a showing network 10 at a first time and FIG. 6b showing network 10 at a second time later than the first time and with node 12b having been removed from network 10. Again, particular nodes 14, 16, 18 are subsumed into nodes 12 generally. Because network 10 incorporates multiple nodes 12 having multiple links 20, there may be multiple different paths or routes 100a (denoted by the relatively thick line), 100b (denoted by the relatively thin line) over which a message from one node 12 may pass to reach a destination node 12 via one or more intervening nodes 12. However, because nodes 12 are mobile, the movement of nodes 12 may cause certain paths, such as path 100a, to become or remain available and others, such as path 100b, to become unavailable. In various embodiments, network 10 may proactively assess the links 20 of network 10 in order to characterize the structure of network 10 and possible paths 100a, 100b messages can take on an ongoing basis.

In an embodiment, nodes 12 that are directly connected by links 20 periodically exchange messages indicating the continued presence of link 20. In various embodiments, the messages that nodes 12 exchange include the current geographic location of nodes 12. In FIG. 6a, node 12b is present and available for communication. In FIG. 6b, node 12b is either unavailable for communication or may be expected to become unavailable or unreliable. If node 12a determines from the message that node 12b is moving away geographically, node 12a may attempt to find a new path 100a to a destination node 12 that does not pass via node 12b, as in the case of path 100b. If such paths 100a do exist, node 12a may withdraw all paths that pass via unstable node 12b, in the illustrated embodiment path 100b, and develop new paths that use more stable links 20.

In circumstances where alternative paths 100a do not exist, node 12a may attempt to rebroadcast on path 100b in the event that path 100b remains available. However, in an embodiment, node 12a may indicate in an update message that link 20 is becoming unstable. Thus, other nodes 12 in network 10 may become aware of the fact that link 20 along path 100b is becoming unstable and try to select a path, such as path 100a, that have more stable links 20.

It is noted that, as disclosed above, network communication broker 30 (FIG. 1) may be configured to manage inter-group communications and links according to the inter-group communication protocol, while each group 22 (FIG. 1) individually may maintain an intra-group communication protocol via group manager node 24 (FIG. 1). It should be understood that in the exemplary embodiment of FIGS. 6a and 6b, the principles of paths 100 are explained without respect to whether or not nodes 12 are in different groups 22 (FIG. 1) and, as such, whether, in certain embodiments, communication between individual nodes 12 are controlled by network communication broker 30 (FIG. 1) or group manager node 24 (FIG. 1).

As illustrated in FIG. 6a, node 12a has two paths 100a, 100b to destination node 12c, both paths 100a, 100b being by way of node 12d. Node 12a selects path 100b to reach node 12b and advertises this path 100b to the rest of network 10. When node 12b starts moving relative to node 12a, (FIG. 6b), node 12a may determine that link 20 between node 12a and node 12c is becoming unstable. As a result, node 12a may withdraw path 100b that passes via node 12b and propagates path 100a that passes via node 12e, which may have a more stable link 20.

As part of the route advertisement, path 100b may be assigned a mobility index, which is an anticipated relative speed of at least some of nodes 12 which comprise path 100b. While relative speed of nodes 12 may vary dependent on the particular application in question (for instance, what is fast for a land vehicle may be slow for an aerial vehicle), it will be appreciated that for various implementations of network 10 various mechanisms may be assigned to denote relative speed of each node 12, including relative speed in standard units (kilometers per hour, miles per hour and so forth) or relatively subjective metrics. In an embodiment, the mobility indices are stationary, low, medium and high. In various embodiments, relative mobility indexes may be kept for each node 12. In an embodiment, each node 12 maintains its own mobility index. In an embodiment, when a node 12 appends its domain into a path 100a or 100b, node 12 also includes its mobility pattern index and a timestamp. Thus path 100a, 100b may consist of a sequence of nodes 12 and their corresponding mobility indexes and timestamps. In an exemplary embodiment, a path 100a or 100b may include data such as low [2011-10-30 T 10:20] (indicating low mobility and an accompanying time stamp indicating the date and time), medium [2011-10-30 T 12:30] and medium [2011-11-30 T 12:45]). Nodes 12a may be configured to select paths 100a or 100b based the mobility index of the various other nodes 12.

Alternatively, each path 100a or 100b may be assigned a route mobility index based on various factors, including the mobility indexes of the constituent nodes 12 of the path 100a, 100b. The mobility index of path 100a, 100b may be based on the highest mobility index of a constituent node 12 of the path 100a, 100b. Alternatively, the mobility index of the path 100a, 100b may be based on an average or other mathematical relationship of the mobility indexes of the constituent nodes 12.

In an embodiment, nodes 12 maintain a mobility index table of some or all of nodes 12 in network 10. In an embodiment, all of nodes 12 maintain the mobility index table for all nodes 12 in network 10. In such an embodiment, the mobility index table maintains current or generally current mobility indexes for links 20 of group 22 (FIG. 1) to which node 12 belongs and which node 12 has or may be likely to encounter. When node 12 receives a path 100a, 100b, node 12 may reference each link 20 in the path 100a, 100b to determine if link 20 is already in the mobility index table. If link 20 is not in the mobility index table, node 12 may add link 20 to the mobility index table. If link 20 is in the mobility index table, then node 12 may update a table entry if the timestamp of path 100a, 100b is newer than the one in the mobility index table. Paths 100a, 100b and links 20 may be ranked on one or more mobility index tables to establish preferred paths 100a, 100b.

In an exemplary embodiment of FIG. 6a, path 100b, for instance, may include the following network information transmitted periodically from nodes 12: node 12d low [2011-10-30 T 10:20]; node 12b medium [2011-10-30 T 12:30] link-mobility: low; node 12b medium [2011-10-30 T 12:30] node 12c medium [2011-11-30 T 12:45] link-mobility: medium. If node 12a receives a new path 100a and their corresponding mobility indexes and timestamps are low [2011-10-30 T 3:20], medium [2011-10-30 T 3:30] and medium [2011-11-30 T 3:45], then node 12a may update the table as follows: node 12d [2011-30 T 3:20] node 12e medium [2011-10-30 T 3:30] link-mobility: medium; node 12e medium [2011-10-30 T 3:30] node 12c medium [2011-11-30 T 12:45] link-mobility: medium.

In various alternative embodiments, one or more paths 100a, 100b may be based on geographic proximity, establishing paths 100a, 100b based on nodes 12 which have the physically shortest distance separating them. Other factors may include signal strength of links 20 between nodes 12, signal speed and signal capacity, i.e., the amount of data which may be transmitted over link 20 per unit time. Such considerations and others may apply both to intra-domain and inter-domain links 20.

Periodically, node 12 may use the table to rank paths 100a, 100b that it has received from neighboring nodes 12 based on the mobility index table. Node 12 may then replace paths 100a, 100b that have high probabilities of being disconnected with more stable paths 100a, 100b.

Figure 7A:
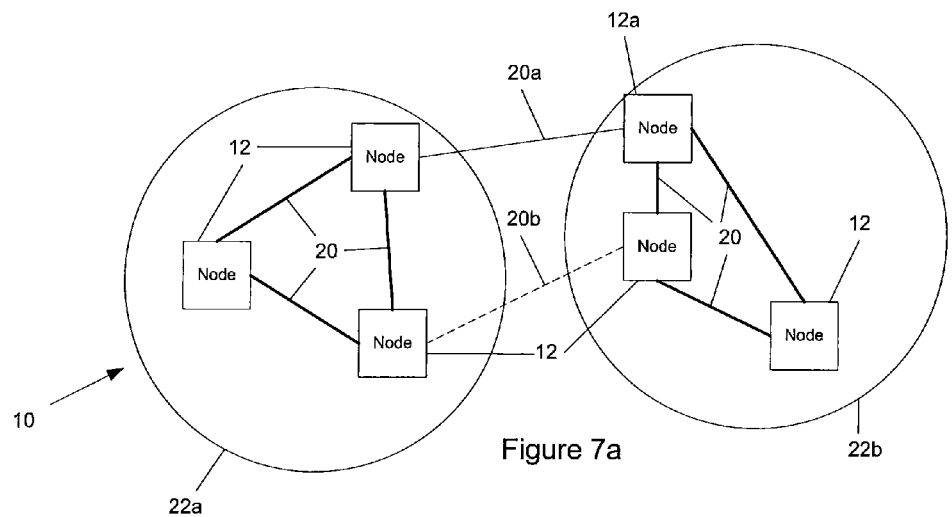
FIGS. 7a and 7b are exemplary, simplified illustrations of policy-based peering.
Figure 7B:
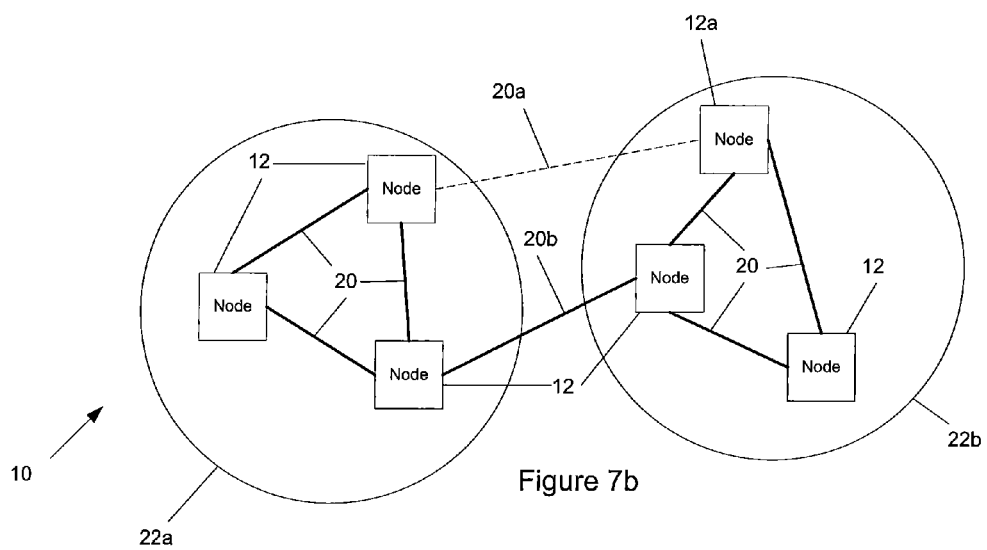

FIGS. 7a and 7b are exemplary, simplified illustrations of policy-based peering of nodes 12 in which node 12a is in physical motion relative to other nodes 12, with FIG. 7a showing node 12a at a location at a first time and FIG. 7b showing node 12b having moved to a different location at a second time later than the first time. As with other exemplary embodiments above, previously independently identified elements such as peripheral nodes 14, gateway nodes 16 and third-party nodes 18 are subsumed in nodes 12 generally, though are understood to be incorporated where appropriate. As discussed in detail above, nodes 12 may be configured with different rules for establishing peer-to-peer connections 20, such as link stability and signal strength. In an embodiment, nodes 12 within each group 22 coordinate among themselves to abide by such peering policies. Based on the internal beacon messages transmitted by nodes 12, nodes 12 in each group 22 may be configured to select nodes 12 external to their group 22 to establish a peer-to-peer connection 22 that meets peering policies.

In the illustrated embodiment of FIGS. 7a and 7b, groups 22a and 22b are configured to select a single path over which to communicate, and, in the illustrated embodiment, the sole rule for establishing an inter-group peer-to-peer link is to select the geographically shortest distance between a node 12 of each group 22. As simplified, links 20a and 22b are the potential links between groups 22a and 22b. In FIG. 7a, link 22a is active owing to the associated nodes 12 being geographically closest to one another. Link 22b is inactive, owing to the associated nodes 12 being farther apart than the nodes 12 of link 22a.

However, over time, as nodes 12 transmit beacon signals including geographic positioning and mobility index, it may become apparent that node 12a is shifting with respect to other nodes 12, as shown in the transition from FIG. 7a to FIG. 7b. The relative movement of node 12a causes link 20a to become geographically longer than link 20b. Upon determination that link 20a is longer than link 20b based on a comparison of the geographical locations of nodes 12, nodes 12 may determine that link 20b should be active and link 20a deactivated.

It is to be understood that the illustrative embodiment of FIGS. 7a and 7b is simplified, and that actual implementation of the peer-to-peer rules may incorporate more than one rule. Distance between nodes 12 may, for instance, be balanced against link quality or link mobility. Consequently, link 20a may be maintained as the link between groups 22a and 22b if link 20a is of higher quality than link 20b or if node 12a has a relatively low mobility index, the actual movement of node 12 notwithstanding. Additionally, not only previously identified links 20a, 20b may be considered, but rather multiple possible links 20 between different nodes 12. In an embodiment, each node 12 of each group 22a, 22b is considered against each node 12 of the other group 22a, 22b.

Figure 8:
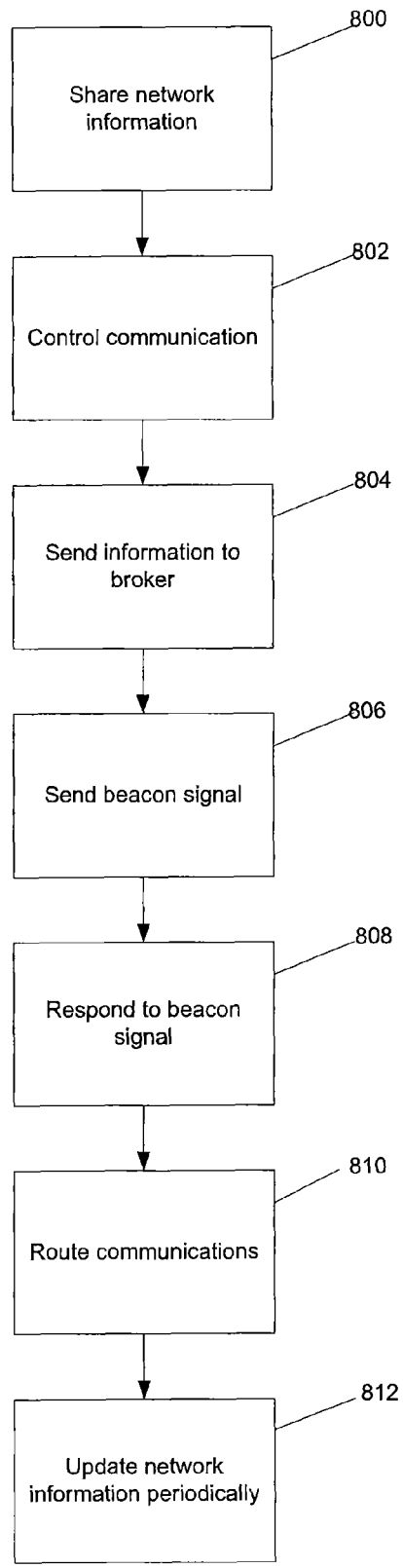
FIG. 8 is a flowchart for utilizing an embodiment of the network of FIG. 1.

FIG. 8 is a flowchart for communicating according to an inter-domain protocol in network 10 between nodes 12 of groups 22 (FIG. 1). Network information is shared (800) between nodes 12 of groups 22 according to an intra-domain communication policy as managed by group manager node 24. Communication is controlled (802) among nodes 12 of different groups or domains 22 by broker or network communication broker 30 according to an inter-domain protocol. Nodes 12 send (804) information to broker 30.

In various embodiments, a node 12 sends (806) a beacon signal, either after the various information sharing and communication steps (800-804), as illustrated, or in parallel with the information sharing and communication steps. In various embodiments, broker 30 sends the beacon signal. At least one of nodes 12 which receive the beacon signal respond (808) to the beacon signal, in various embodiments with node or network information about the responding node 12. In various embodiments, all nodes 12 which receive the beacon signal respond.

In various embodiments, sharing (800) network information is based on signal strength, signal quality, an identity of a destination node 12 or destination domain 22, and a geographic location of nodes 12. Sharing (800) network information may be over paths 100 which may be established on the basis of geographic proximity, i.e., the closest nodes 12 to one another, and on signal strength, signal speed and signal capacity of links 20. Sharing (800) network information may be periodic.

Network information may be indicative of a condition of the network, and may incorporate various network factors discussed herein. In various embodiments, location information is supplied, as is the mobility index. On the basis of the network information, broker or network communication broker 30 is configured to route (810) communication throughout network 10. Optionally, network information such as the mobility index is updated (812) periodically.

Figure 9:
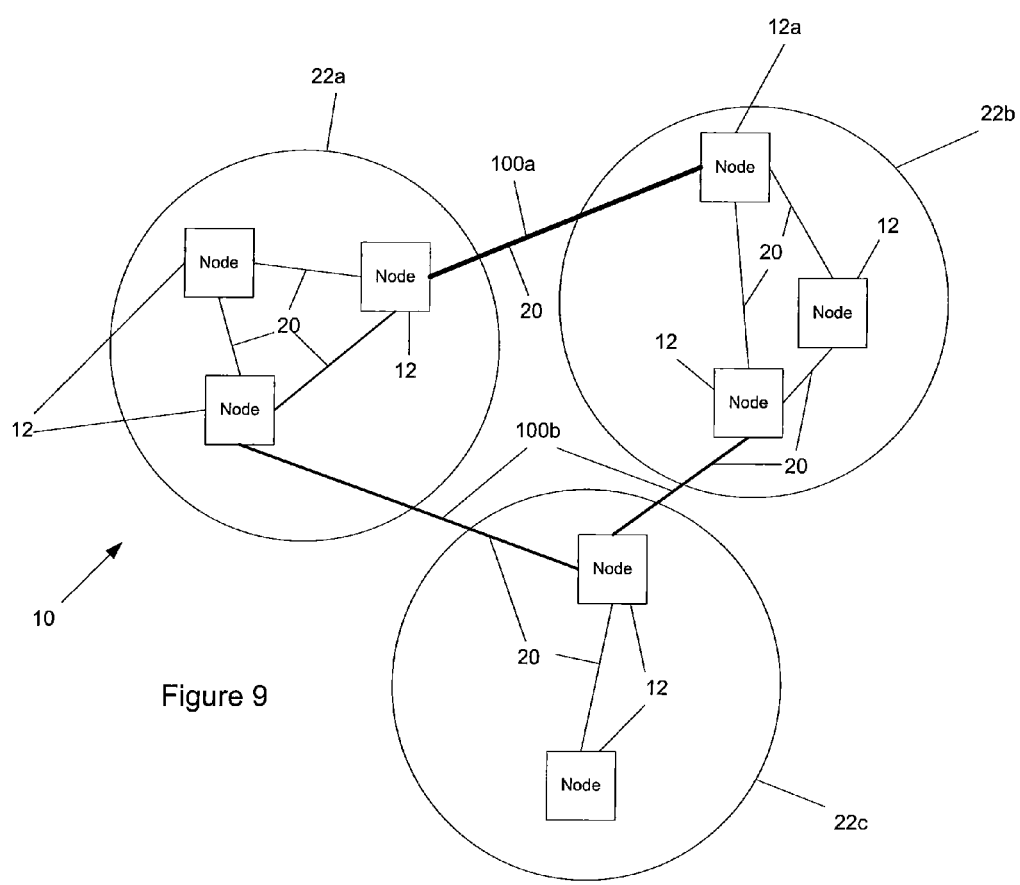
FIG. 9 is an example of proactive inter-domain path maintenance in a network.

FIG. 9 is an example of proactive inter-domain path maintenance based on the systems and methods described above. Path 100a may be identified as the preferred path between groups 22a and 22b while node 12a is geographically stationary. In an embodiment, path 100a incorporates high data rates with high link stability. However, when node 12a either begins to move or anticipates moving, and therefore adjusts its mobility index, path 100b via group 22c may become the preferred link between groups 22a and 22b. This may be the case, notwithstanding path 100b being longer and having a lower data rate.

In certain circumstances, such as those of the instant example, the mobility index of node 12a and/or path 100a may be weighted very highly in comparison with data rate and length. In such embodiments, the absolute stability of paths may be of greater import than data rate and the administrative simplicity which may be achieved through limiting the number of nodes 12 in the path. However, in other circumstances, and particularly in circumstances where proactive link and path maintenance is of less concern, data rate and path length may be weighted relatively higher. It is also noted that the principles illustrated herewith with respect to inter-group communications may also apply equally well to intra-group communication and paths which incorporate both inter- and intra-group links 20.

Figure 10:
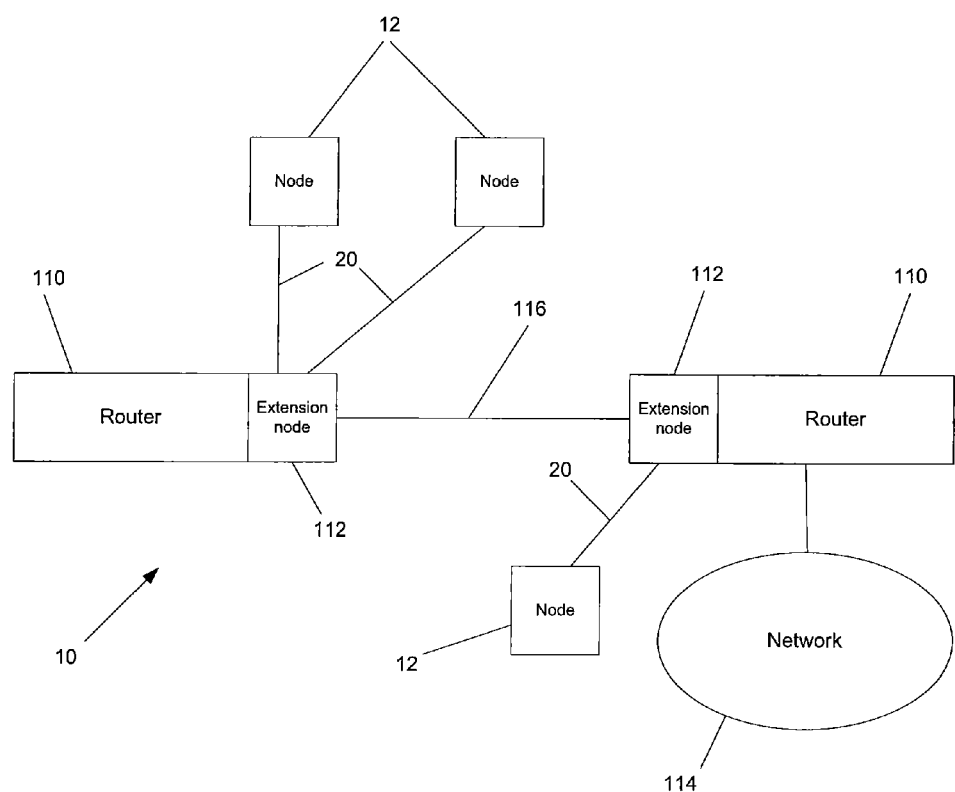
FIG. 10 is an example of router extension architecture.

FIG. 10 is an example of router extension architecture based on the systems and methods described above. As discussed above, the software of nodes 12 may be designed to be integrated into current implementations of the existing standard networking protocols, such as the Border Gateway Protocol (BGP) as discussed in the Background section. Thus, in various embodiments, nodes 12 may be added to existing commercial or proprietary routers 110 whose software can be accessed and modified, such as open source routers.

Certain commercial routers 110 may be difficult to access and alter their routing software. In an embodiment, extension nodes 112 may provide for interaction of nodes 12 with existing commercial routers 110 without requiring modification to the routers' software. In an embodiment, extension node 112 peers with router 110 and is coupleable to router 110 through an interface of router 110. In various embodiments, extension node 112 is commercial hardware such as a personal computer or proprietary or specialized hardware. One example of such specialized hardware is an AXP[1] (Application eXtension Platform) router card.

[1] AXP is a trademark of Cisco Systems, Inc.

Router 110 may be configured such that extension node 112 is router's 110 only peer node 12. Also, router 110 may be configured such that router 110 passes internal and external beacons between extension node's 112 interface and other nodes 12. Nodes 12 and extension node 112 may discover and peer with each other based on such beacons, as described above.

Where multiple routers 110 each incorporate an extension node 112, as in FIG. 10, extension nodes 112 may peer with one another based on the transmission and reception of beacons, as discussed above. Extension node 112 may notify router 110 of other nodes 12. Router 110 may then propagate such routing information to external network 114 via the conventional networking protocol of router 110, permitting communication between nodes 12 and elements of network 114.

In various embodiments, routers 110 may be unable, without modification, to communicate directly with one another. Thus, while a message may route through routers 110, routers 110 may be unable to communicate directly. In an embodiment, extension nodes 112 may insert a static route 116 for communication between routers 110. Static route 116 may be incorporated as a conventional link 20 for the purposes of message routing and may, in various embodiments, be any of the communication schemes normally associated with links 20, including wired and wireless schemes. Static route 116 may be recovered and reassigned in the event of disruption or removal of router 110.

Figure 11:
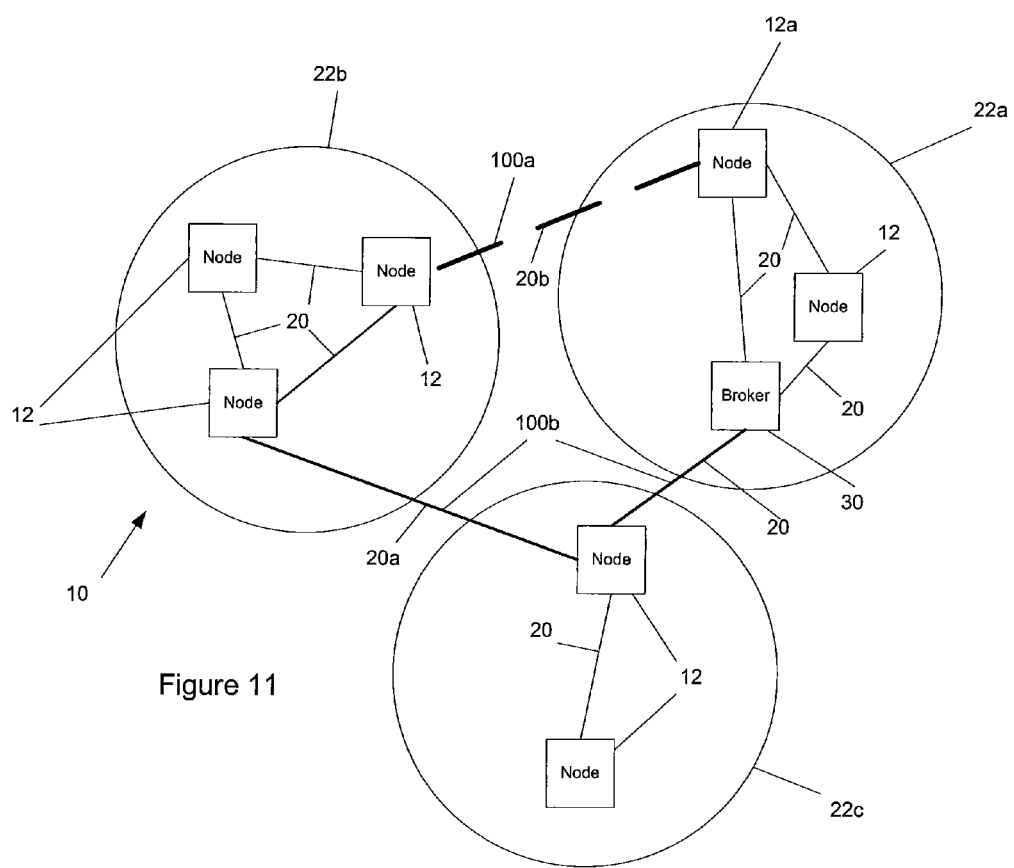
FIG. 11 is an example of discovery and policy based peering of nodes of the communication network of FIG. 1.
Figure 12:
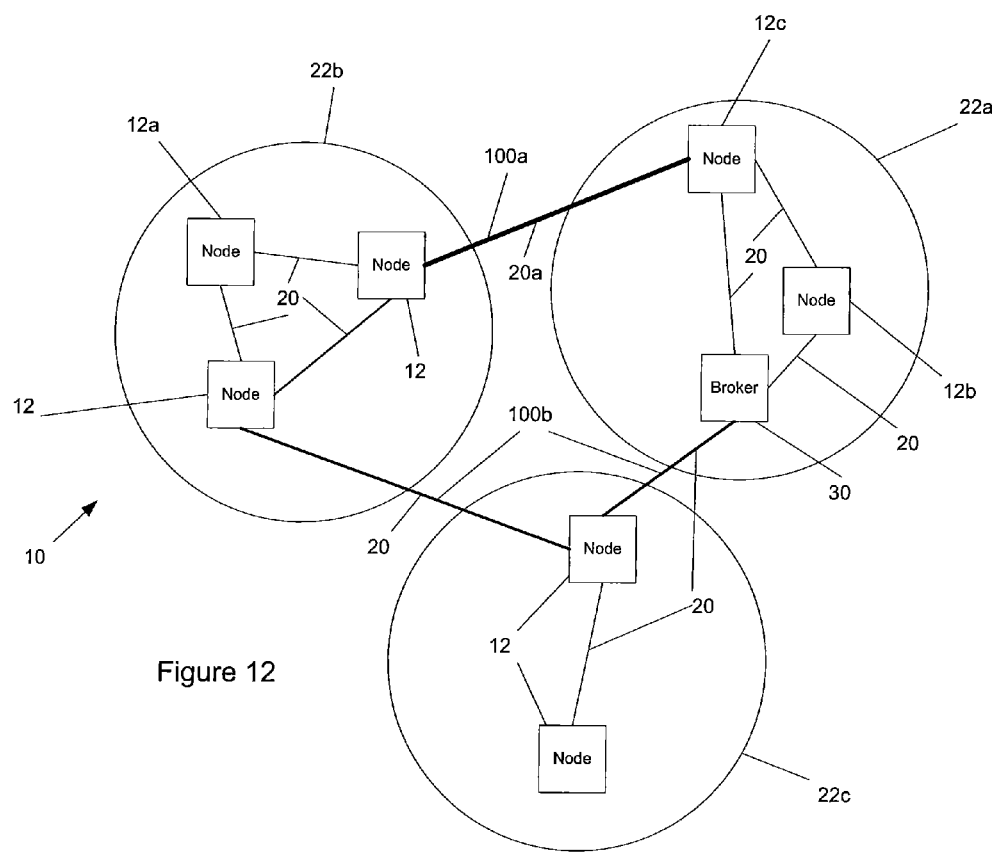
FIG. 12 is an example of link and path creation and adjustment in the communication network of FIG. 1.
Figure 13:
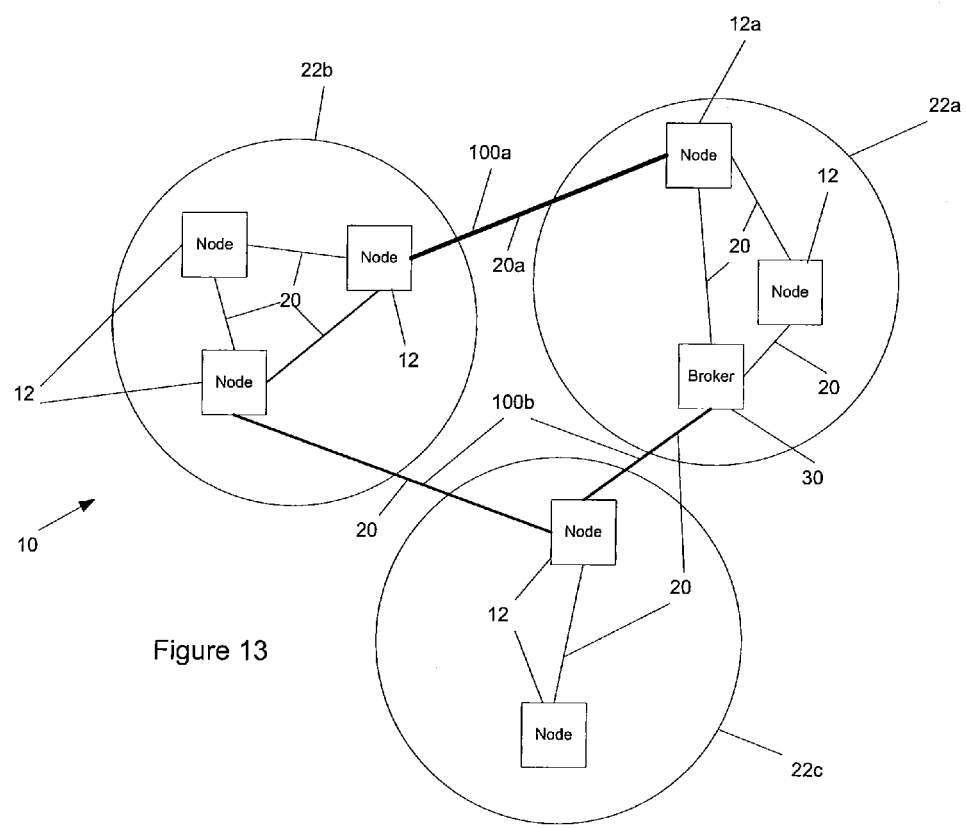
FIG. 13 is an example of a routing technique of the communication network of FIG. 1.

FIGS. 11, 12 and 13 provide examples of the networks 10 and methods described above. In the exemplary embodiments, groups 22 are configured to establish a single path 100 to any other group 22.

FIG. 11 is an example of the discovery mechanism between nodes 12 and policy based peering between nodes 12. In the exemplary embodiment, nodes 12 seek to form the shortest path 100a, 100b between nodes 12. Links 20 within and between groups 22a and 22c are managed, at least in part, by network communication broker 30. Group 22b is a mobile group and is approaching groups 22a and 22c. Inter-group links 20a are established by the discovery mechanism described above between the respective nodes 12 and based on the criterion of the exemplary embodiment that the shortest link 20a be selected.

Path 100a is initially established between nodes 12a and 12b. However, in the illustrated example, link 20b between groups 22a and 22b is broken. The discovery mechanism of nodes 12 detects the breakdown of link 20b. As a result, traffic between group 22a and 22b is routed through group 22c via newly established path 100b. If link 20b is reestablished at some point, path 100a may be reestablished and path 100b disregarded.

The time needed to establish path 100b upon the breakdown of link 20b may be variable depending on the frequency of packet transmission between nodes 12a and 12b and the number of packets which may be selected as being missed before a fault is identified. Table 1 below provides examples of time to repair and establish link 22b or the time to establish path 100b as the preferred path 100 between nodes 12a and 12b following the breakdown of link 22b. The first parameter is the time interval in seconds between beacons from nodes 12. The second tunable parameter is the number of beacons that need to be missed before it is determined a link 20 has failed and reconfiguration of paths 100a, 100b is initiated.

TABLE 1

| Link recovery time | |
| --- | --- |
| Beacon signal interval (seconds)/ missed beacon signals | Recovery time (seconds) |
| 1/2 | 5.38026 |
| 1/5 | 8.83856 |
| 3/2 | 11.721101 |
| 3/5 | 21.5149 |
| 5/2 | 17.668559 |
| 5/5 | 32.587266 |
| 10/2 | 32.554325 |
| 10/5 | 62.157928 |

FIG. 12 is an example of network communication broker's 30 capacity to define and adjust links 20 and paths 100. As above, paths 100a and 100b are both possible between nodes 12a and 12b. As nodes of groups 22a, 22b, 22c send their geographical coordinates to network communication broker 30, network communication broker initially selects path 100a on the basis of being the shortest individual path between nodes 12a and 12b. However, if node 12c moves, causing path 100a to become longer than path 100b, network communication broker 30 may direct that link 20a be disconnected and path 100b utilized for communications between nodes 12a and 12b.

FIG. 13 is an example of routing techniques of node 12, such as proactive mobility monitoring and mobility index. In the example, node 12a provides a mobility status as stable in path 100a. As a result, network communication broker's 30 routing mechanism in groups 22a and 22b may select path 100a to route communications between nodes 12b and 12c. If, however, node 12a becomes mobile, node 12a may provide network communication broker 30 with an updated status indicating a mobility status of unstable. Consequently, network communication broker's 30 routing mechanism in groups 22a and 22b may select the longer but more stable path 100b over the shorter but unstable path 100a.

In various embodiments, a transition from node 12a being stable to being unstable causes network communication broker 30 to switch between path 100a and path 100b in approximately nine (9) seconds to approximately twenty (20) seconds. In an embodiment, a switch by node 12a to a mobile state takes on average of 11.35 seconds with a standard deviation of 2.43 seconds. The switch of node 12a to stable state takes on average 17.35 seconds with a standard deviation of 2.74 seconds.

Thus, embodiments of the device-implemented network and method are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A device-implemented network, comprising:
   a plurality of domains each having a plurality of nodes, wherein said plurality of nodes of each of said plurality of domains share network information, indicative of a mobility index comprising an anticipated relative speed of at least some of said plurality of nodes, with one another according to an intra-domain communication policy;
   an inter-domain protocol configured to control communication between at least one of said plurality of nodes of one of said plurality of domains and at least one of said plurality of nodes of a different one of said plurality of domains; and
   a broker configured to be communicatively coupled to said plurality of nodes and configured to control communication according to said inter-domain protocol and to which all of said plurality of nodes of each of said plurality of domains are configured to send said network information and configured to route inter-domain communication between individual ones of said plurality of nodes according to said mobility index;
   said mobility index being periodically updated based, at least in part, on communication between said broker and said at least some of said plurality of nodes.

2. The network of claim 1 wherein said inter-domain protocol comprises, at least in part, a beacon signal configured to be sent to at least one node of at least one of said plurality of domains.

3. The network of claim 2 wherein said plurality of nodes are configured to respond to said beacon signal such that at least one of said plurality of nodes responds to said beacon signal.

4. The network of claim 3 wherein any of said plurality of nodes which receive said beacon signal are configured to respond to said beacon signal.

5. The network of claim 4 wherein all of said plurality of nodes which receive said beacon signal are configured to respond to said beacon signal.

6. The network of claim 1 wherein said intra-domain communication policy is based, at least in part, on signal strength.

7. The network of claim 1 wherein said intra-domain communication policy is based, at least in part, on signal quality.

8. The network of claim 1 wherein said intra-domain communication policy is based, at least in part, on an identity of a destination domain of said plurality of domains.

9. The network as in claim 1 wherein said intra-domain communication policy is based, at least in part, on a geographic location of said plurality of nodes.

10. The network of claim 1 wherein said intra-domain communication policy is based, at least in part, on a communication path between individual ones of said plurality of nodes.

11. The network of claim 10 wherein said communication path has at least an intervening one of said plurality of nodes.

12. The network of claim 11 wherein said path is based, at least in part, on a closest one of said plurality of nodes.

13. The network of claim 11 wherein said path is based, at least in part, on a signal strength.

14. The network of claim 11 wherein said path is based, at least in part, on a highest signal speed.

15. The network of claim 11 wherein said path is based, at least in part, on a highest signal capacity.

16. The network of claim 11 wherein said path is based, at least in part, on a geographic stability of said intervening one of said plurality of nodes.

17. The network of claim 1 wherein said broker is one of said plurality of nodes of one of said plurality of domains.

18. The network of claim 1 wherein all of said plurality of nodes sends said network information to said broker periodically.

19. The network of claim 1 wherein said information indicative of said condition of said network comprises location information of at least some of said plurality of nodes.

20. The network of claim 1 wherein, when one of said plurality of nodes is not communicatively coupled to said broker, said one of said plurality of nodes utilizes said inter-domain protocol.

21. A network communication broker configured to control communication in a network having a plurality of domains each having a plurality of nodes, comprising:
   a communication module operatively coupled to each of said plurality of nodes of each of said plurality of domains, configured to obtain network information, indicative of a mobility index comprising an anticipated relative speed of at least some of said plurality of nodes, from each of said plurality of nodes of each of said plurality of domains according to an intra-domain communication policy; and
   an inter-domain protocol configured to control communication between at least one of said plurality of nodes of one of said plurality of domains and at least one of said plurality of nodes of a different one of said plurality of domains and configured to route inter-domain communication between individual ones of said plurality of nodes according to said mobility index;

said mobility index being periodically updated based, at least in part, on communication between said broker and said at least some of said plurality of nodes.

22. The network communication broker of claim 21 wherein said inter-domain protocol comprises, at least in part, a beacon signal configured to be sent to at least one node of at least one of said plurality of domains.

23. The network communication broker of claim 22 wherein said plurality of nodes are configured to respond to said beacon signal such that at least one of said plurality of nodes responds to said beacon signal.

24. The network communication broker of claim 23 wherein any of said plurality of nodes which receive said beacon signal are configured to respond to said beacon signal.

25. The network communication broker of claim 23 wherein all of said plurality of nodes which receive said beacon signal are configured to respond to said beacon signal.

26. The network communication broker of claim 21 wherein said intra-domain communication policy is based, at least in part, on signal strength.

27. The network communication broker of claim 21 wherein said intra-domain communication policy is based, at least in part, on signal quality.

28. The network communication broker of claim 21 wherein said intra-domain communication policy is based, at least in part, on an identity of a destination domain of said plurality of domains.

29. The network as in claim 21 wherein said intra-domain communication policy is based, at least in part, on a geographic location of said plurality of nodes.

30. The network communication broker of claim 21 wherein said intra-domain communication policy is based, at least in part, on a communication path between individual ones of said plurality of nodes.

31. The network communication broker of claim 30 wherein said communication path has at least an intervening one of said plurality of nodes.

32. The network communication broker of claim 31 wherein said path is based, at least in part, on a closest one of said plurality of nodes.

33. The network communication broker of claim 31 wherein said path is based, at least in part, on a signal strength.

34. The network communication broker of claim 31 wherein said path is based, at least in part, on a highest signal speed.

35. The network communication broker of claim 31 wherein said path is based, at least in part, on a highest signal capacity.

36. The network communication broker of claim 31 wherein said path is based, at least in part, on a geographic stability of said intervening one of said plurality of nodes.

37. The network communication broker of claim 21 wherein said broker is one of said plurality of nodes of one of said plurality of domains.

38. The network communication broker of claim 21 wherein said all of said plurality of nodes sends said network information to said broker periodically.

39. The network communication broker of claim 21 wherein said information indicative of said condition of said network comprises location information of at least some of said plurality of nodes.

40. The network communication broker of claim 21 wherein said information indicative of said condition of said network is indicative of a mobility index comprising an anticipated relative speed of at least some of said plurality of nodes.

41. The network communication broker of claim 21 wherein, when one of said plurality of nodes is not communicatively coupled to said broker, said one of said plurality of nodes utilizes said inter-domain protocol.

42. A method for communicating according to an inter-domain protocol between a plurality of nodes of a plurality of domains, each of said plurality of domains having some of said plurality of nodes, said communicating being controlled by a broker, comprising:
sharing network information, indicative of a mobility index comprising an anticipated relative speed of at least some of said plurality of nodes, between said plurality of nodes of each of said plurality of domains according to an intra-domain communication policy;
controlling, by said broker, communication according to said inter-domain protocol between at least one of said plurality of nodes of one of said plurality of domains and at least one of said plurality of nodes of a different one of said plurality of domains;
sending to said broker network information from all of said plurality of nodes of each of said plurality of domains;
routing inter-domain communication between individual ones of said plurality of nodes by the broker according to said mobility index; and
periodically updating said mobility index based, at least in part, on communication between said broker and said at least some of said plurality of nodes.

43. The method of claim 42 further comprising the step of sending a beacon signal to at least one node of at least one of said plurality of domains according to said inter-domain protocol.

44. The method of claim 43 further comprising the step of responding to said beacon signal such that at least one of said plurality of nodes responds to said beacon signal.

45. The method of claim 44 wherein said responding step comprises any of said plurality of nodes which receive said beacon signal responding to said beacon signal.

46. The method of claim 45 wherein said responding step comprises all of said plurality of nodes which receive said beacon signal responding to said beacon signal.

47. The method of claim 42 wherein said sharing step according to said intra-domain communication policy is based, at least in part, on signal strength.

48. The method of claim 42 wherein said sharing step according to said intra-domain communication policy is based, at least in part, on signal quality.

49. The method of claim 42 wherein said sharing step according to said intra-domain communication policy is based, at least in part, on an identity of a destination domain of said plurality of domains.

50. The network as in claim 42 wherein said intra-domain communication policy is based, at least in part, on a geographic location of said plurality of nodes.

51. The method of claim 42 wherein said sharing step according to said intra-domain communication policy is based, at least in part, on a communication path between individual ones of said plurality of nodes.

52. The method of claim 51 wherein said communication path has at least an intervening one of said plurality of nodes.

53. The method of claim 52 wherein said path is based, at least in part, on a closest one of said plurality of nodes.

54. The method of claim 52 wherein said path is based, at least in part, on a signal strength.

55. The method of claim 52 wherein said path is based, at least in part, on a highest signal speed.

56. The method of claim 52 wherein said path is based, at least in part, on a highest signal capacity.

57. The method of claim 52 wherein said path is based, at least in part, on a geographic stability of said intervening one of said plurality of nodes.

58. The method of claim 42 wherein said sending step occurs periodically.

59. The method of claim 42 wherein said information indicative of said condition of said network comprises location information of at least some of said plurality of nodes.

60. The method of claim 42 wherein, when one of said plurality of nodes is not communicatively coupled to said broker, said sharing step utilizes said inter-domain protocol.

* * * * *